WIDE-BAND DISTRIBUTION AMPLIFIER SYSTEM

Filed Feb. 20, 1952 2 Sheets-Sheet 1

INVENTOR.
Ben H. Tongue

BY Rines and Rines

ATTORNEYS.

WIDE-BAND DISTRIBUTION AMPLIFIER SYSTEM

Filed Feb. 20, 1952 2 Sheets-Sheet 2

INVENTOR.
Ben H. Tongue
BY Rines and Rines
ATTORNEYS.

United States Patent Office 2,815,406

Patented Dec. 3, 1957

2,815,406

WIDE-BAND DISTRIBUTION AMPLIFIER SYSTEM

Ben H. Tongue, Mount Vernon, N. Y.

Application February 20, 1952, Serial No. 272,644

18 Claims. (Cl. 179—171)

Figure 1:
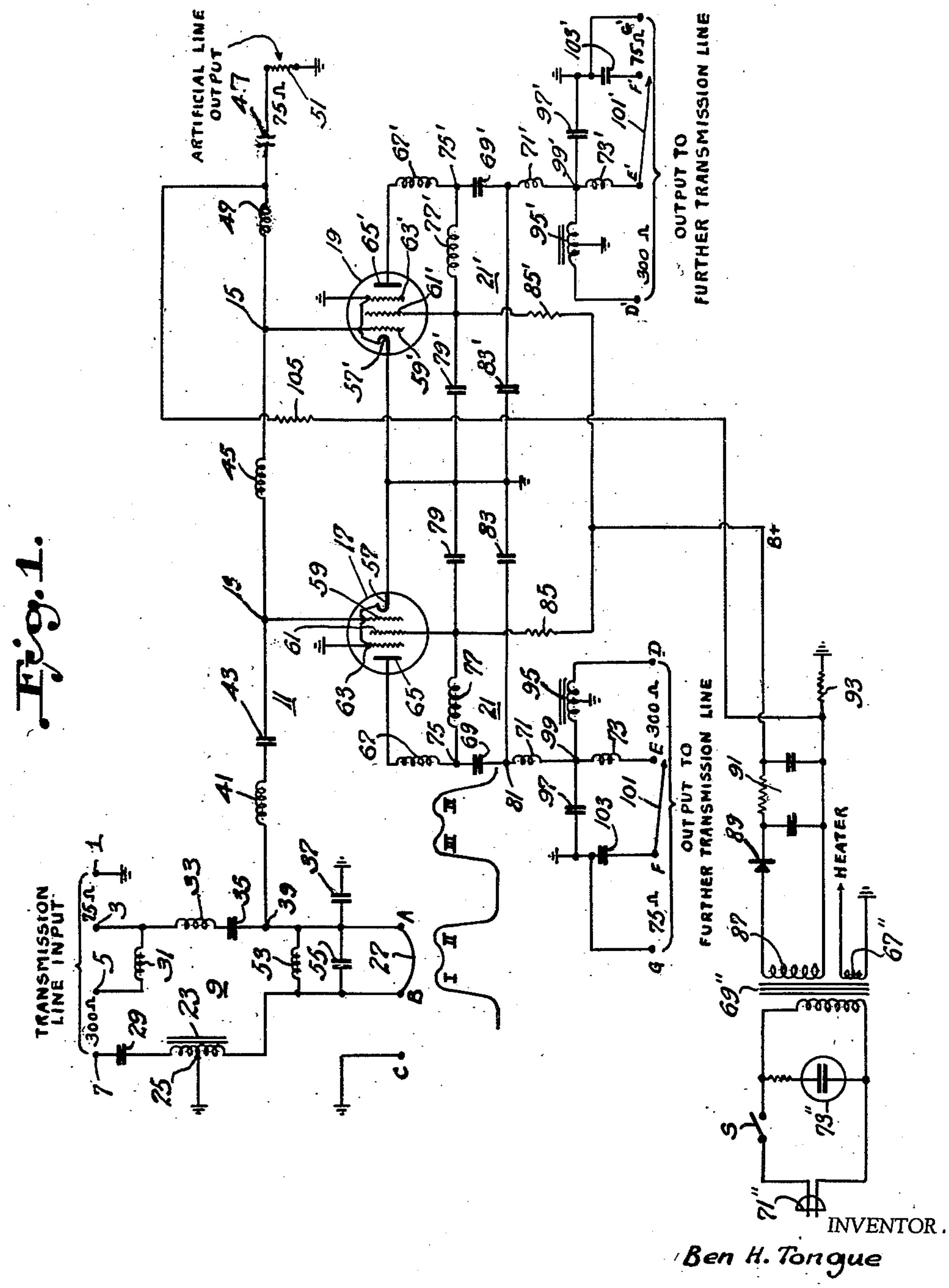

The present invention relates to broad- or wide-band amplifier distribution systems and, more particularly, to radio-frequency amplifier distribution systems for providing a plurality of isolated output circuits to distribute radio signals lying within a plurality of separated, broad or wide radio-frequency bands.

An object of the present invention is to provide a new and improved distribution amplifier system for distributing and making available at a plurality of isolated outputs amplified, separated, wide radio-frequency bands.

One of the important applications of the present invention is in the field of television. Various types of distribution amplifiers have been proposed for providing television signals from a single antenna system to a plurality of television sets, such as, for example, to the television receivers disposed in the rooms of hotels or apartment houses, or to receivers in the individual homes of a town that may be located in an area shielded, as by mountains, from the commercial television broadcast transmission. Among present-day distribution amplifier systems are those utilizing a mixer into which amplified television signals are fed from antenna systems adapted to receive the individual television channel frequencies. The output of the mixer system is fed along a tapered transmission line from successive portions of which outputs are taken through successive resistances. The resistance values of the resistances are successively varied or tapered to provide substantially the same signal-to-noise ratio at each outlet along the line, in order to feed a plurality of television receivers. Such systems are disadvantageous because they are limited in the number of outlets available, inasmuch as there are successive losses produced along the tapered line and the outlets are not capable of complete isolation from one another. Since the weakest usable signal for television receivers is of the order of 1,000 microvolts, relatively few television receiver sets can be successfully fed from such tapered-line systems, and, in addition, such systems are relatively complex. Not only, therefore, is an engineer ordinarily required to set up the system, but the cost of the component parts is high.

A further object of the present invention is to provide a new and improved television distribution amplifier system that is not subject to the above-mentioned disadvantages, and that, on the contrary, provides an unlimited number of outlets and overcomes losses in the transmission line between the antenna and the successive television set outlets.

Still a further object is to provide a distribution amplifier system of the above-described character that is adapted to operate substantially uniformly with input and output transmission lines of widely different characteristic impedances.

Still another object of the invention is to provide a distribution system that requires no special connectors, no external matching transformers, no individual channel equipment, and that automatically amplifies all channels as it distributes with a high degree of isolation between distribution outlets, producing no loss of signal at the ultimate distribution points.

Other and further objects will be explained hereinafter and will be more particularly pointed out in the appended claims.

In summary, the present invention relates to an electric system having, in combination, means for receiving a broad band of radio frequencies fed by a first transmission line means having any one of a purality of markedly different characteristic impedances, means for responding substantially uniformly to the broad band of radio frequencies while presenting a substantial impedance match to the said plurality of characteristic impedances, artificial transmission line means connected at one end to the last-named means and adapted to terminate at the other end in a load, and distribution amplifier means having input and output circuits, the input circuits being connected intermediate the ends of the artificial transmission line means and the output circuits being adapted to connect with a third transmission line means. The output circuits of the distribution amplifier means provide isolated outputs adapted to operate with third transmission-line means of any of the said plurality of markedly different characteristic impedances. Preferred circuit constructions are hereinafter discussed in detail.

Figure 2:
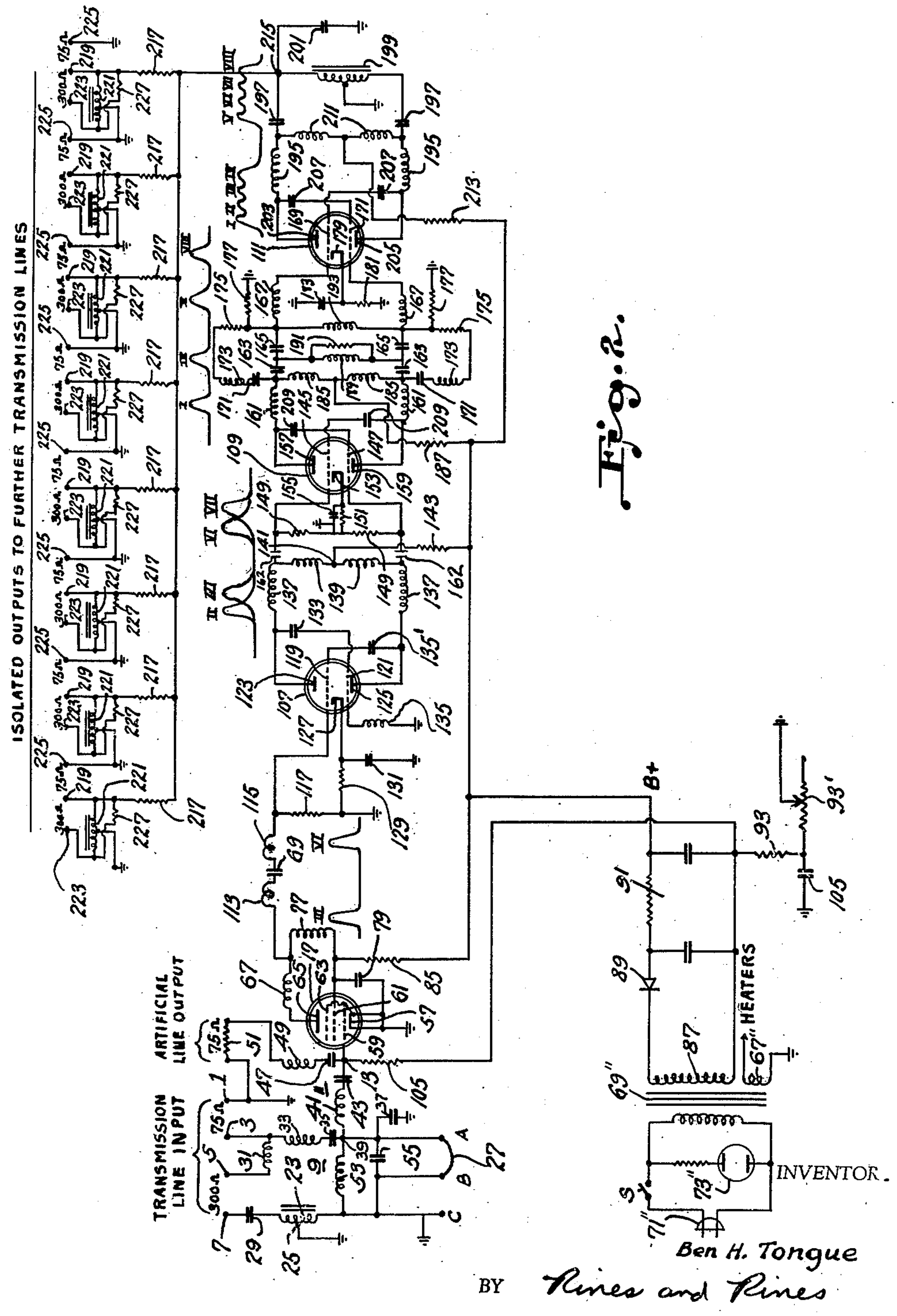

The invention will now be described in connection with the accompanying drawings, Fig. 1 of which is a schematic circuit diagram of a distribution amplifier embodying a pair of isolated output channels and Fig. 2 is a view of a modification embodying eight isolated outlets.

Referring to Fig. 1, radio-frequency energy may be fed from a transmission line, labelled "Transmission Line Input," having one of a plurality of markedly different characteristic impedances, to the terminals 1, 3, 5 and 7. The radio-frequency energy received by the terminals 1, 3, 5 and 7 is then passed through a filter network 9 and thence along an artificial transmission line 11 at successive intermediate points 13 and 15 of which amplifier channels are provided comprising vacuum-tube amplifiers 17 and 19, respectively. The amplifiers 17 and 19 have in their respective output circuits appropriate similar networks 21 and 21′ that, in turn, feed multi-impedance isolated output outlets comprising the respective groups of terminals D, E, F, G and D′, E′, F′ and G′ for connection to still other transmission line means, labelled "Further Transmission Line," such as may be directly connected to feed television receiver sets. While reference will hereinafter be made to the important application of the invention to television systems, it is to be understood, however, that the invention is of broader application, being adapted for use with any radio-frequency bands.

Inasmuch as present-day antenna systems utilize, customarily, either a 75-ohm coaxial transmission line system from the antenna, or a 300-ohm parallel-wire transmission line, it is highly desirable that the input circuit 9 be adapted substantially to match either of these two markedly different characteristic transmission-line impedances. The further requirement of the input circuit 9 on the case of television reception, is that the circuit 9 must be able to respond substantially uniformly to all of the television frequencies, ranging from about 54 to about 88 and from about 174 to about 216 megacycles, no matter whether a 75-ohm or a 300-ohm transmission line is connected to the terminals 1, 3, 5 and 7.

While in present-day distribution amplifier systems matching transformers, elevator coils and the like have been utilized, they have generally been utilized without proper compensation for their stray inductance and capacity, resulting in considerable losses over the television bands. It has heretofore been the general practice, furthermore, merely to match the system for the 75-ohm transmission line and pay little or no attention to the merit of the match to a 300-ohm transmission line. In accordance with the present invention, on the other hand, a system is provided that properly compensates for the stray inductance and capacity of matching transformers, passes all of the television frequencies with substantially uniform response, and provides an excellent match to both 75- and 300-ohm input transmission lines.

In order to accomplish these ends, the input circuit 9 is designed as a constant K-type band-pass filter network, tuned to cover completely both of the television bands. In the case of a 300-ohm input transmission line, the constant K-type band-pass filter network responds substantially uniformly to the broad bands of television radio frequencies, while substantially matching the 300-ohm characteristic impedance of the input line. The filter network comprises a two-terminal push-pull branch connected to the terminals 5 and 7. A jumper 27 is connected between the terminals B and A, shown at the bottom of the input network 9. The two-terminal push-pull branch comprises the stray inductance of the transformer 23, the center tap of which is shown grounded at 25, the capacitance of a condenser 29 directly connected to the left-hand terminal 7, the inductance of a coil 31 directly connected to the right-hand terminal 5, the inductance of a further coil 33 and the capacitance of a condenser 35. It will be noted that with the jumper 27 in the position between the terminals A and B, before-mentioned, the condenser 29, the transformer 23, the inductances 31 and 33 and the condenser 35 are all connected in series between the left-hand and right-hand push-pull terminals 7 and 5. The bottom end of the transformer 23 is connected by the jumper 27 through a condenser 37 to ground, so that the grounded center tap 25 is effectively capacitively connected to the lower end of the transformer 23. The term "ground" is used to connote not only actual earthing, but, also, a common reference potential, such as chassis potential, as is well known. The lower side of the condenser 35 is shown connected to the left-hand side of the condenser 37 at a point 39. The point 39 connects to a single-ended branch comprising a series-connected further inductance 41 and capacitance 43. In shunt between the point 39 and ground, moreover, there exists the actual inductance of half of the transformer 23, in parallel with its distributed capacitance and the capacitance of condenser 37. The push-pull input at the terminals 5 and 7 is thus transformed into a single-ended system at the point 39.

The indictance 41, in addition to serving as part of the before-mentioned constant K-type filter network, functions with the capacity of the input circuit of the vacuum-tube amplifier 17 as an element of the artificial transmission line 11. A similar further inductor 45 serves in connection with the input circuit capacitance of the amplifier vacuum tube 19 as a further element of the artificial transmission line 11. The artificial line 11 continues with the condenser 47 and the inductor 49, and terminates in a 75-ohm characteristic impedance load 51, such as a resistor. The transformation from the push-pull to the single-ended system, before mentioned, thus matches the 300-ohm line connected between the terminals 5 and 7, to the 75-ohm artificial transmission line.

It will now be explained how the constant K-type filter of the circuit 9 operates to respond substantially uniformly to all the frequencies of the television band. The value of the condenser 29 and the value of the leakage inductance of the transformer 23 are caused to resonate at substantially the same frequency as the resonant frequency of the inductances 31, 33 and the condenser 35. The inductances 31, 33 and the capacitance 35, in turn, effectively resonate at a frequency corresponding to the resonant frequency of one-half of the transformer 23 between the grounded center tap 25 and one of the ends thereof, in cooperation with the associated distributed capacitance of one-half of the transformer 23 and the capacitance of the condenser 37. The said resonance frequency of one-half of the transformer 23 and the condenser 37, in turn, is made to correspond substantially to the resonant frequency of the first elements 41, 43, etc. of the artificial transmission line 11. This frequency is adjusted to a value substantially corresponding to the geometric mean between the low- and high-frequency limits of the television bands. Broad-band response is thus produced for all of the television frequencies in both the low and high television bands, eliminating undesired frequencies lying outside the television bands. The before-described circuit, moreover, makes use of the inherent inductance and capacitance of the impedance transformation elements to accomplish the dual purpose of impedance matching when a 300-ohm input line is utilized and producing the desired broad-band response.

When it is desired to connect a 75-ohm line input transmission line to the filter network 9, the connections are made between the terminals 1 and 3. The jumper 27 is moved to connect the lower terminals B and C, thereby placing a further shunt-connected inductance 53 and capacitance 55 in circuit. The transformer 23 is thus not then utilized, but instead, a second constant K-type filter for producing a broad response over the complete television band is provided. This second constant K-type filter network embodies on the right-hand side a ground connection at the terminal 1. On the left-hand side, the inductance 33 and capacitance 35, previously described as connected to the terminal 5 of the push-pull 300-ohm input circuit, are connected in series with the before-mentioned single-ended branch comprising the artificial line elements 41 and 43, and in parallel with the further grounded shunt-connected inductance 53 and capacitance 55. The 75-ohm transmission line, of course, automatically matches the 75-ohm artificial line 11, before described.

The successive intermediate points 13 and 15 along the artificial transmission line 11 provide for feeding the input signal to a plurality of outlets, in this case two, through the amplifiers 17 and 19. The vacuum-tube amplifiers 17 and 19 are of identical nature, as are the input and output circuits connected thereto. It will suffice, therefore, to describe only the input and output circuits of the amplifier 17, it being understood that the same remarks apply to the input and output circuits of the amplifier 19, the elements of which are the same as the elements of the input and output circuits of the amplifier 17 and are represented by the same numerals modified with a prime notation. The amplifier 17 is a pentode having a cathode 57, a control grid electrode 59, a screen grid 61, a suppressor grid 63 and a plate or anode 65. Heater current for the electron-emissive cathode 57 is supplied by a heater winding 67″ that constitutes a secondary winding of a power transformer 69″, fed, when a switch S is closed, from a plug 71″ that may be inserted in an alternating-current mains outlet. A pilot tube is shown at 73″ shunting the primary winding of the transformer 69″ to provide an indication of the application of power.

The signal at the point 13 along the artificial line 11 is fed between the control grid 59 and the grounded cathode 57 of the amplifier 17. In the output circuit connected between the plate or anode 65 and the cathode 57 of the amplifier 17, an inductance 67, a capacitor 69, another inductance 71 and still a further inductance 73 are connected in series with a terminal E. Between the point 99 of series connection of the coils 71 and 73 is connected a grounded-center-tapped transformer 95 which terminates in a further terminal D. Connected between the point 75 of series connection between the inductance 67 and the condenser 69, is a coil 77 that connects with the screen grid 61 of the amplifier 17, and then with ground through a by-pass condenser 79. The series-connection point 81 between the condenser 69 and the coil 71 is connected through a condenser 83 to ground. The screen grid 61 is, in turn, connected to a dropping resistor 85. The upper terminal of an upper secondary winding 87 of the before-mentioned transformer 69 is connected through a rectifier 89 and a $\pi$-type resistance-capacitance filtering network 91 to provide rectified B+ plate potential across the dropping resistor 85. The bottom terminal of the secondary winding 87 is returned to ground through a resistor 93 and is also connected through a resistor 105 to the junction between the condenser 47 and coil 49 of the artificial line 11. It is to be understood, of course, that any other conventional heater, plate and other electrode supply source may be equally well utilized, as may other types of vacuum-tube amplifiers. The suppressor electrode 63 of the amplifier 17 is connected to the cathode 57 through ground.

The output circuit network 21, before-described, is a quadruple-tuned circuit, multiply resonant to a pair of narrow frequency bands in each of the low and high television bands in order to provide a discriminatory amplified response to the television signals in those bands, and sharply to attenuate and reject any frequencies outside or between the bands, thereby to provide signal selectivity with high gain. The values of the elements of the network 21 to produce such multiple resonant response to widely separated frequency bands may be selected as follows. The stray capacitance in the output circuit of the tube 17 and the inductance of the coil 77 resonate at substantially the same frequency as the inductance of the transformer 95 and its distributed capacitance to ground, condenser 83 and condenser 97. This frequency is preferably set in the vicinity of about 88 megacycles, as shown at II. Condensers 69 couple these two resonant circuits together and produce a further resonance at a relatively low frequency, preferably set in the neighborhood of about 54 megacycles, as shown at I. The before-mentioned circuits thus constitute a $\pi$-type capacitively coupled double-tuned circuit, providing a broad response to all frequencies in the low television band.

For the frequencies in the high television band, the following circuit elements are of importance: the stray output capacitance of the amplifier 17, the series inductance of the coil 67, the shunt capacitance of the condenser 83, the inductance of the series coil 71 and the capacitance of the condenser 97, in parallel with the distributed capacitance of the transformer 95. This circuit is equivalent to a two-section constant K-type low-pass filter. When such a filter is misterminated, it provides a filter response that is flat starting from the low frequencies and peaks at a pair of frequencies beyond which cut-off occurs. The above-mentioned elements are adjusted so that substantially equal magnitude resonant responses III and IV are produced in the high television band, the peaks occurring, say, in the neighborhood of 174 megacycles and in the neighborhood of about 216 megacycles.

The resulting broad-band response I–II–III–IV, restricted to the desired separated television bands only, is thus produced by the network circuit 21. Quadruple tuned circuits of this character are described in more detail in my copending application, Serial No. 193,810, filed November 3, 1950, and also in connection with the quadruple tuned circuit of Fig. 2. Other types of equivalent networks that may be substituted for the network 21 are also therein described.

The output of the network 21 may be fed to either a 75-ohm or a 300-ohm line for energizing a television receiver. The matching transformer 95 provides a four-times impedance step-up, so that between the terminals D and E, connection to a substantially 300-ohm impedance transmission line may be effected. When a 75-ohm connection is desired in the output channel of the amplifier 17, it is effected by connecting a jumper 101 between the terminals, F and E, and providing connection to a 75-ohm line between the terminals F and G. This arrangement adds the inductance of the coil 73 as a further series-connected element in cooperation with a condenser 103 as an associated shunt element. The value of the capacitance 103 is adjusted to provide the same frequency-response effect with the 75-ohm line connection at the terminals F and G, as the distributed shunt capacity and leakage inductance of the transformer 95 provides for the 300-ohm connection between the terminals E and D. This may be achieved as follows. The response of the quadruple circuit 21, when connected to a 300-ohm line between the terminals E and D, appearing between the points 99 and the terminal D, may first be peaked by adjusting the elements for maximum gain and the proper frequency response I–II–III–IV. A 75-ohm load may then be connected between the terminal E, joined by the jumper 101 to the terminal F, and ground, and the value of the inductance 73 and the capacitor 103 may then be adjusted also to produce the proper quadruple peak resonant response. Little change is produced by this last adjustment upon the resonant response achieved with a 300-ohm line, so that the system provides substantially the overall response illustrated by I, II, III and IV both when a 300-ohm line and a 75-ohm line are connected to the appropriate output terminals.

There is thus available between the terminals D, E, F, G in the output circuit of the amplifier 17, and D′, E′, F′, and G′ of the similar amplifier 19, isolated outlets for feeding along two independent channels all of the television signals, without loss, and with high signal-to-noise ratio.

The two sets of output outlets of Fig. 1 are particularly useful, for example, in a single home where two television sets are utilized. If more than two sets of outlets are required, it is merely necessary, in accordance with the present invention, to remove the artificial-line terminating resistor 51 and to connect the unit shown in Fig. 1 into the terminals 1 and 3 of a similar unit, thereby to provide two further outlets. With the terminating resistor 51 thus removed from one of the units, of course, reflection will occur at the open-circuited end of the line 11 in the vicinity of the series-connected reactance 49 of the line 11, increasing the voltage at the input circuit of the amplifier close to the open end, which may, in some cases be useful; but, by adding a second unit to the open end of the line 11 of the said one unit, the terminating resistor 51 of the second unit will terminate the line 11 of the said one unit. The same remarks apply, also, to the circuit of Fig. 2, later discussed. Clearly, further units as shown in Fig. 1 may be also added, ad infinitum, providing isolated distribution outlets operating with no loss and with high signal discrimination.

If, on the other hand, it is desired to embody a larger number of distribution terminals in a single amplifier structure, as, for example, for servicing a hotel, or an apartment house or the like, a similar system, slightly modified as illustrated in the embodiment of Fig. 2, may be utilized. Successive systems as shown in Fig. 2 may also be cascaded further to increase the number of outlets.

In the system of Fig. 2, the broad-band input circuit 9 is the same as the broad-band input circuit illustrated in Fig. 1, the numerals common to the two figures illustrating the common circuit elements. The elements 41, 43, 47 and 49 of the artificial transmission line 11 are also the same as the corresponding elements of the line 11 of Fig. 1, with the amplifier 17 corresponding to the amplifier 17 of Fig. 1, connected at an intermediate point 13 along the artificial transmission line 11. The terminating 75-ohm load resistor 51 of the artificial transmission line 11 corresponds to the same load 51 in the output of the artificial transmission line 11 of Fig. 1. The power supplies of the systems of Figs. 1 and 2 are similar with the exception that the resistor 93 of Fig. 1 is shown in Fig. 2 as comprising a fixed element 93 and an element 93′ of variable resistance for changing the bias on the control grid 59 of the amplifier 17, thus to regulate the gain of the amplifier 17. The resistors 93 and 93′ are by-passed to ground by a condenser 105.

Instead of providing, in the circuit of Fig. 2, a plurality of points intermediate the ends of the artificial transmission line for tapping off the distribution outlets, however, the output of the amplifier 17, that is fed at the single intermediate point 13, feeds a plurality of successive push-pull triode amplifier stages, the output circuits of which, in turn, provide a large number of isolated outputs for connection to various distribution outlets. There are, though, several elements in the output circuit of the amplifier 17 in common with the elements in the output circuit network 21 of the amplifier 17 of Fig. 1. Instead of sufficient elements to provide the before-mentioned quadruple tuned circuit 21 of Fig. 1, however, the output circuit of the amplifier 17 of Fig. 2 is provided with elements tuned to provide a single narrow resonant response in each of the widely separated high and low television bands, as shown at III and VI in the waveform response illustrated to the right of the coil 77. In the low television band, a resonant circuit is provided for producing the peak III that comprises the coil 77, the shunt output capacitance of the amplifier 17 and the input capacity of subsequent double-triode amplifiers 107. In the high television band, the resonant response VI is produced by the resonance of the shunt output capacity of the amplifier 17, the inductances 67, 113 and 115, and the shunt input capacitance of the amplifiers 107.

The output of the amplifier 17 developed across a resistor 117 is fed between the control grid 119 and the cathode 127 of the upper section of the double-triode amplifiers 107. The cathode 127 is returned to ground through a resistor 129 which is by-passed by a condenser 131. The control grid 121 of the lower triode of the double-triode amplifiers 107 is connected by a condenser 133 to the plate 123 of the upper triode section of the amplifiers 107 and by an inductance 135 to ground. The values of the elements 135 and 133 are selected so that for the frequencies in the low television band, the lower triode amplifier grid 121 is essentially grounded. The voltage upon the grid 121 approximates the cathode voltage developed across the cathode resistor 129 by the upper triode section. There is thus something of a push-pull operation resulting at the plate 125 of the lower triode section of the amplifiers 107 and the plate 123 of the upper triode section of the amplifiers 107.

In the output circuits of these substantially push-pull amplifiers 107 are connected a pair of similar networks adapted to produce, also, a single-peaked response in each of the low and high television bands, but responses II and VII that respectively overlap the responses III and VI produced in the output circuit of the amplifier 17, as illustrated above the condenser 133. The control grid 119 of the upper triode section of the amplifiers 107 is connected to the plate 125 of the lower triode section by a condenser 135′. The output circuit networks that produce the overlapping responses II and VII, before described, comprise similar coils 137 connected in series with the respective plates 123 and 125, and connected together through similar further coils 139, the junction 141 of which is connected through a dropping resistor 143 to the B+ terminal of the power supply to provide plate voltage for the amplifiers 107. The coils 137 are connected through coupling condensers 162 to the control electrodes 145 and 147 of a further pair of push-pull connected triode amplifiers 109. The signal outputs of these networks are developed across similar series-connected resistors 149 the outer terminals of which are connected between the control-grid electrodes 145 and 147 of the amplifiers 109, and the point of series connection of which is connected through a cathode-dropping resistor 151 to the cathode 153 of the two-triode sections of the push-pull amplifiers 109, the cathode being by-passed to ground by a condenser 155. Since the common connection between the inductances 139 is permitted to float with respect to ground, the low-band resonant circuit comprising the output capacity of the amplifiers 107, the coils 139 and the input capacity of the amplifiers 109 provides a tendency to attempt to block unequal voltages developed between the two sections of the amplifiers 107, thereby substantially to equalize the voltages applied to the control grids 145 and 147 of the pair of triodes of the push-pull amplifiers 109.

The output networks of the push-pull amplifiers 109 are provided with circuit elements that, like the elements of the output-circuit network 21 of the amplifier 17 of Fig. 1, produce quadruple-tuned responses—two resonant responses in the low band and two resonant responses in the high band. The plates 157 and 159 of the upper and lower triode sections of the push-pull amplifiers 109 are connected to similar networks comprising series-connected inductors 161, first and second series-connected condensers 163 and 165 and further series-connected inductors 167 connected respectively to the upper and lower control grid electrodes 169 and 171 of a further pair of push-pull-connected triode amplifiers 111. Shunting the series-connected condensers 163 and 165 are coupling condensers 171 in series with further coils 173 and resistors 175. The junction between each resistor 175 and the second series-connected condenser 165 is returned to ground through a resistor 177. The cathodes 179 of the amplifiers 111 are also connected to ground through a cathode resistor 181, by-passed by a condenser 183. Shunting the series connections of the inductances 161 and capacitances 163 are a pair of similar coils 185 the intermediate connection of which is connected to the B+ plate supply for supplying plate potential to the amplifiers 109 through a plate resistor 187. Cconnected between the series-connected condensers 163 and 165 is still a further coil 189 shunted by a damping resistor 191, and connected between the series-connected junctions of the condensers 165 and coils 167 is a further coil 193.

The operation of these quadruple tuned networks in the output circuits of the amplifiers 109 may be briefly explained as follows. The series-connected network condensers 163 and 165 are made of such value that they present extremely low impedance to frequencies lying within the high radio-frequency television band so that they may, for purposes of this discussion, be considered as substantially short-circuited at those frequjencies. The coils 185, 173 and 193 are made of sufficient inductance that at the same high frequencies they present extremely high impedances, and for purposes of the present discussion, may be considered as open-circuited at the high-channel frequencies. The network system coupling the stages 109 and 111 at the high-channel frequencies, therefore, behaves substantially as a T-inductively coupled double-tuned circuit, having narrow resonant responses of substantially the same magnitude at two separated frequency bands shown, for example, at V and VIII in Fig. 2, selected at the extremes of the high-frequency bands, respectively overlapping the previously produced responses VI and VII.

At low-channel frequencies, however, the inductance 189, which is of value considerably less than the previously described inductors 173, 185, 193, may be treated as of extremely low impedance and hence, a short-circuit. The inductors 167 and 161 are similarly small and may be similarly ignored. The larger coils 185, 173 and 193, however, and the condensers 163 and 165 present finite impedances to the frequencies located in the low radio-frequency band, so that the network behaves as if comprising only a pair of parallel-connected coils and condensers 163, 185 and 165, 193, interconnected by a series-connected coil 173. This circuit will be recognized as of the $\pi$-inductively coupled double-tuned type producing, therefore, two similar resonant responses to two separated narrow frequency bands in the low radio-frequency band, as shown, for example, at I and IV in Fig. 2, selected at the extremes of the low-frequency band, respectively overlapping the previously produced bands II and III. By proper adjustment, the magnitude of the responses I and IV may be made substantially the same as the magnitude of the responses V and VIII.

The output of the quadruple tuned networks as amplified in the push-pull stages 111, is fed to further broadly resonant networks having coils 195 connected in series with the plates 203 and 205 of the amplifiers 111, shunt-connected similar coils 211 the junction between which is connected to the B+ supply voltage through a load 213, and condensers 207 interconnecting the grids 169 and 171 with the respective plates 205 and 203. Coupling condensers 197 connect the coils 195 to opposite ends of a matching iron-core transformer 199 having a grounded center tap. The upper end 215 of the transformer 199 is by-passed to ground by a condenser 201. The elements 211, 197 and 199 provide a broad response in the low band when the point 215 is properly loaded. At frequencies in the high band, the output capacitance of the tube 111, the series coils 195, the stray shunt capacitance of the transformer 199 and the capacitance of the condenser 201 produce a broad resonant response. These networks thus respond broadly to the television bands, as discussed in connection with the input circuit of the amplifier 17, producing amplification in accordance with the selective resultant response I–II–III–IV and V–VI–VII–VIII, previously developed, that respectively covers the approximately 54 to 88 and 174 to 216 megacycle bands.

The before-mentioned upper end 215 of the transformer 199, is connected to a single-ended output comprising a plurality of similar attenuator impedances, such as resistors 217. The plurality of resistors 217, in turn, connect with a plurality of supplemental similar iron-core matching transformers 221 one side of which provides an outlet terminal 219, the other side, an outlet terminal 223, and the grounded center tap, an outlet terminal 225. Shunting the supplemental transformers 221 are further resistors 227. Further 300-ohm transmission lines for feeding television sets may be connected between the outlet terminals 219 and 223, and 75-ohm lines between the terminals 225 and 219. Attenuation is thus provided between the point 215 and all of the outputs by the resistors 217, the values of which determine, of course, the amount of signal that will appear at the 75-ohm outlets, modified, however, by the fact that one-quarter of the resistance of resistors 227 appears across the 75-ohm terminals. All of the outputs are isolated by virtue of this attenuation, the degree of isolation being approximately the square of the attenuation. The supplemental transformers 221 provide for four times impedance step-up for optimum results with an 300-ohm output line termination between the terminals 223 and 219. The shunt resistors 227 assist in providing the desired impedance when a 300-ohm load is connected across the terminals 223 and 219.

A commercial unit of the character illustrated in Fig. 1, utilizing a pair of 6BC5 amplifier tubes 17 and 19, and adapted to operate in the before-mentioned television bands with line input and line output impedances of either 75 or 300 ohms has been found to produce full isolation at the two output outlets with sufficient gain that no loss results at the ultimate points of distribution. A commercial embodiment of the circuit of Fig. 2, employing three 6J6 and one 6BC5 vacuum tubes produces no loss on all channels, automatically, and provides full electronic distribution outlet isolation measured at a minimum of 35 db between outlets.

Further modifications will occur to those skilled in the art and all such are considered to fall within the spirit and scope of the present invention as defined in the appended claims.

What is claimed is:

1. An electric system having, in combination, means comprising two pairs of optionally operative input terminals for receiving a broad band of radio frequencies fed by a first transmission line means having one of two characteristic impedances of high and low value, respectively; a constant K-type filter network having an input and output, the input being connected to the receiving means at one of the said pairs of input terminals for responding substantially uniformly to the broad band of radio frequencies while substantially matching the high characteristic impedance, the network comprising between its said input and output a two-terminal push-pull branch and a single-ended branch, the two-terminal push-pull branch having inductance and capacitance connected to one terminal, capacitance connected to the other terminal, the said inductance and capacitances being connected in series with an iron core transformer having a grounded center tap connected by capacitance to one end of the transformer, the single-ended branch having series-connected further inductance and capacitance connected to the push-pull branch at the said one end of the transformer; a further constant K-type filter network having an input and an output, the input being connected to the other of the said pairs of input terminals for responding substantially uniformly to the broad band of radio frequencies while substantially matching the low characteristic impedance, the further network comprising between its said input and output the said inductance and capacitance that is connected to the said one terminal of the push-pull branch connected at a predetermined point in series with the said single-ended branch and a shunt-connected inductance and capacitance connected between the said predetermined point and ground; and a common output circuit connected to the said outputs of both of the filter networks.

2. An electric system having, in combination, means comprising two pairs of optionally operative input terminals for receiving a broad band of radio frequencies extending from about 54 to about 216 megacycles fed by a first transmission line means having one of two characteristic imepdances of respective values substantially 75 and 300 ohms; a constant K-type filter network having an input and an output, the input being connected to the receiving means at one of the said pairs of input terminals for responding substantially uniformly to the said broad band of radio frequencies while substantially matching the 300-ohm characteristic impedance, the network comprising between its said input and output a two-terminal push-pull branch and a single-ended branch, the two-terminal push-pull branch having inductance and capacitance connected to one terminal, capacitance connected to the other terminal, the said inductance and capacitances being connected in series with an iron core transformer having a grounded center tap connected by capacitance to one end of the transformer, the single-ended branch having series-connected further inductance and capacitances connected to the push-pull branch at the said one end of the transformer; a further constant K-type filter network having an input and an output, the input being connected to the other of the said pair of input terminals for responding substantially uniformly to the said broad band of radio frequencies while substantially matching the 75-ohm characteristic impedance, the further network comprising between its said input and output the said inductance and capacitance that is connected to the said one terminal of the push-pull branch connected at a predetermined point in series with the said single-ended branch and a shunt-connected inductance and capacitance connected between the said predetermined point and ground; a common output circuit connected to the said outputs of both of the filter networks and including a multiply resonant circuit adapted resonantly to respond to separated frequency bands of from about 54 to about 88 megacycles and from about 174 to about 216 megacycles; and impedance-transformation means for adapting the output circuit for use with substantially 75- and 300-ohm loads.

3. The electric system claimed in claim 2 and in which the impedance-transformation means comprises an iron-core transformer having a grounded center-tap, the transformer being connected across the said output circuit for transforming the impedance of the said output circuit for use with a substantially 300-ohm load, and an inductance-capacitance circuit for use with a substantially 75-ohm load.

4. An electric system as claimed in claim 1 and in which means is provided for connecting and disconnecting the said capacitance connection from the center tap of the said transformer to the said one end of the transformer and disconnecting and connecting the said shunt-connected inductance and capacitance from and to ground, respectively.

5. In an electric system having means for receiving a broad band of radio frequencies fed by transmission-line means having one of two characteristic impedances of high and low value, respectively, impedance-transformation means comprising an iron-core transformer provided with a grounded center tap and the ends of which are connected to the receiving means with one end connected to a plurality of similar distribution impedances each terminating in an output terminal, the impedances attenuating the said radio frequencies to provide a plurality of isolated outputs between the said output terminals and ground for use with a load of impedance corresponding substantially to one of the said characteristic impedances, and a plurality of supplemental iron-core transformers corresponding to the plurality of distribution impedances provided with grounded center taps and each connected at one end to the said output terminal of the corresponding distribution imepdance for effecting between the ends of the supplemental transformers an impedance transformation for use with a load of impedance corresponding to another of the said characteristic impedances.

6. An electric system having, in combination, means comprising two pairs of optionally operative input terminals for receiving a broad band of radio frequencies fed by a first transmission line means having one of two characteristic impedances of high and low value, respectively; a constant K-type filter network having an input and an output, the input being connected to one of the said pairs of input terminals for responding substantially uniformly to the broad band of radio frequencies while substantially matching the high characteristic impedance, the network comprising between its said input and output a two-terminal push-pull branch and a single-ended branch, the two-terminal push-pull branch including a first series-connected inductance and capacitance, and the single-ended branch having a second series-connected inductance and capacitance connected to the push-pull branch; a further constant K-type filter network having an input and an output, the input being connected to the other of the said pairs of input terminals for responding substantially uniformly to the broad band of radio frequencies while substantially matching the low characteristic impedance, the further network comprising the said first series-connected inductance and capacitance connected at a predetermined point in series with the said single-ended branch and a shunt-connected inductance and capacitance connected between the said predetermined point and ground; and a common output circuit connected to the said outputs of both of the filter networks.

7. An electric system having, in combination, means comprising two pairs of optionally operative input terminals for receiving a broad band of radio frequencies fed by a first transmission line means having one of two characteristic impedances of high and low value, respectively; a constant K-type filter network having an input and an output, the input being connected to one of the said pairs of input terminals for responding substantially uniformly to the broad band of radio frequencies while substantially matching the high characteristic impedance, the network comprising between its said input and output a two terminal push-pull branch and a single-ended branch, the two-terminal push-pull branch having groups of connected-together reactive components connected to the two terminals and to one another, to form a filter section and the single-ended branch having a further group of connected-together reactive components connected to the push-pull branch as a further filter section; a further constant K-type filter network having an input and an output, the input being connected to the other of the said pairs of input terminals for responding substantially uniformly to the broad band of radio frequencies while substantially matching the low characteristic impedance, the further network comprising between its said input and output one of the groups of reactive components of the push-pull branch connected at a predetermined point with the said single-ended-branch and a further group of reactive components connected between the said predetermined point and ground; and a common output circuit connected to the said outputs of both of the filter networks.

8. An electric system having, in combination, means comprising two pairs of optionally operative input terminals for receiving a broad band of radio frequencies fed by a first transmission line means having one of two characteristic impedances of high and low value, respectively; a constant K-type filter network having an input and an output, the input being connected to one of the said pairs of input terminals for responding substantially uniformly to the broad band of radio freqeuncies while substantially matching the high characteristic impedance, the network comprising between its said input and output a two-terminal push-pull branch and a single-ended branch, the two terminal push-pull branch having groups of connected-together reactive components connected to the two terminals and to one another to form a filter section, and the single-ended branch having a further group of connected-together reactive components connected to the push-pull branch as a further filter section; a further a constant K-type filter network having an input and an output, the input being connected to the other of the said pairs of input terminals for responding substantially uniformly to the broad band of radio frequencies while substantially matching the low characteristic impedance, the further network comprising between its said input and output one of the groups of reactive components of the push-pull branch connected at a predetermined point with the said single ended branch and a further group of reactive components connected between the said predetermined point and ground; and a common output circuit connected to the said outputs of both of the filter networks and including an artificial transmission line.

9. An electric system having, in combination, means comprising two pairs of optionally operative input terminals for receiving a broad band of radio frequencies fed by a first transmission line means having one of two characteristic impedances of high and low value, respectively; a constant K-type filter network having an input and an output, the input being connected to one of the said pairs of input terminals for responding substantially uniformly to the broad band of radio frequencies while substantially matching the high characteristic impedance, the network comprising between its said input and output a two terminal push-pull branch and a single-ended branch, the two-terminal push-pull branch having groups of connected-together reactive components connected to the two terminals and to one another to form a filter section, and the single-ended branch having a further group of connected-together reactive components connected to the push-pull branch as a further filter section; a further constant K-type filter network having an input and an output, the input being connected to the other of the said pairs of input terminals for responding substantially uniformly to the broad band of radio frequencies while substantially matching the low characteristic impedance, the further network comprising between its said input and output one of the groups of reactive components of the push-pull branch connected at a predetermined point with the said single-ended branch and a further group of reactive components connected between the said predetermined point and ground; and a common output circuit connected to the said outputs of both of the filter networks and including a multiply resonant circuit adapted resonantly to respond to a plurality of separated frequency bands within the said broad band of radio frequencies.

10. The electric system claimed in claim 1 and in which there is provided impedance-transformation means comprising an iron-core transformer provided with a grounded center tap and the ends of which are connected to the output circuit with one end connected to a plurality of similar distribution impedances for attenuating the said radio frequencies to provide a plurality of isolated outputs between the impedances and ground for use with a load of impedance corresponding substantially to one of the said characteristic impedances, and a plurality of supplemental iron-core transformers corresponding to the plurality of distribution impedances provided with grounded center taps and each connected at one end with the said corresponding distribution impedance for effecting between the ends of the supplemental transformers an impedance transformation for use with a load of impedance corresponding to another of the said characteristic impedances.

11. The electric system claimed in claim 1 and in which the output-circuit is provided with load-adapting means that comprises an iron-core transformer provided with a grounded center tap and connected at its ends to the output circuit for transforming the impedance of the said output circuit for use between the said ends of the transformer with a load having an impedance corresponding substantially to one of the said characteristic impedances, and an inductance-capacitance circuit for use with a load having an impedance corresponding substantially to the other of said characteristic impedance.

12. The electric system claimed in claim 2 and in which the multiply resonant circuit comprises a first network resonant to a narrow frequency band in each of the said approximately 54-to-88-megacycle and 174-to-216-megacycle bands, a second network resonant to a pair of narrow frequency bands one overlapping each of the said narrow frequency bands of the first network, a third network resonant to two further pairs of narrow frequency bands overlapping the respective said overlapped narrow frequency bands of the first and second networks, thereby to produce resultant separated bands corresponding substantially to the complete approximately 54-to-88-megacycle and 174-to-216-megacycle bands, and a fourth network broadly resonant to pass the said resultant bands.

13. The electric system claimed in claim 2 and in which the multiply resonant circuit comprises a first network resonant to a narrow frequency band in each of the said approximately 54-to-88-megacycle and 174-to-216-megacycle bands, means for transforming the output of the first network into substantially a push-pull system and amplifying the output thereof substantially in push-pull, a pair of second networks connected to the substantially push-pull amplifying means and resonant to a pair of narrow frequency bands one overlapping each of the said narrow frequency bands of the first network, second push-pull amplifying means connected to the pair of second networks, a pair of third networks connected to the second push-pull amplifying means and resonant to two further pairs of narrow frequency bands overlapping the respective said overlapped narrow frequency bands of the first and second networks, thereby to produce resultant separated bands corresponding substantially to the complete approximately 54-to-88-megacycle and 174-to-216-megacycle bands, and third push-pull amplifying means connected to the pair of third networks and connecting, in turn, with a pair of fourth networks broadly resonant to pass the said resultant bands.

14. The electric system claimed in claim 2 and in which the impedance-transformation means comprises an iron-core transformer provided with a grounded center tap and the ends of which are connected to the output circuit with one end connected to a plurality of similar distribution impedances for attenuating the said radio frequencies to provide a plurality of isolated outputs between the impedances and ground for use with a substantially 75-ohm load, and a plurality of supplemental iron-core transformers corresponding to the plurality of distribution impedances provided with grounded center taps and each connected at one end with the said distribution impedances for effecting between the ends of the supplemental transformers an impedance transformation for use with a substantially 300-ohm load.

15. The electric system claimed in claim 2 and in which the multiply resonant circuit comprises a first network resonant to a narrow frequency band in each of the said approximately 54-to-88-megacycle and 174-to-216 megacycle bands, means for transforming the output of the first network into substantially a push-pull system and amplifying the output thereof substantially in push pull, a pair of second networks connected to the substantially push-pull amplifying means and resonant to a pair of narrow frequency bands one overlapping each of the said narrow frequency bands of the first network, second push-pull amplifying means connected to the pair of second networks, a pair of third networks connected to the second push-pull amplifying means and resonant to two further pairs of narrow frequency bands overlapping the respective said overlapped narrow frequency bands of the first and second networks, thereby to produce resultant separated bands corresponding substantially to the complete approximately 54-to-88-megacycle and 174-to-216-megacycle bands, and third push-pull amplifying means connected to the pair of third networks and connecting, in turn, with a pair of fourth networks broadly resonant to pass the said resultant bands, and in which the impedance-transformation means comprises an iron-core transformer provided with a grounded center tap and the ends of which are connected to the said output circuit with one end connected to a plurality of similar distribution impedances for attenuating the said radio frequencies to provide a plurality of isolated outputs between the impedances and ground for use with a substantially 75-ohm load, and a plurality of supplemental iron-core transformers corresponding to the plurality of distribution impedances provided with grounded center taps and each connected at one end with the said corresponding distribution impedance for effecting between the ends of the supplemental transformers an impedance transformation for use with a substantially 300-ohm load.

16. An electric system as claimed in claim 1 and in which the output circuit comprises an artificial transmission line.

17. An electric system as claimed in claim 6 and in which the output circuit comprises an artificial transmission line.

18. An electric system as claimed in claim 1 and in which the output circuit comprises a multiply resonant circuit adapted resonantly to respond to a plurality of separated frequency bands within the said broad band of radio frequencies and being adapted to connect with a second transmission-line means.

(References on following page)

References Cited in the file of this patent

UNITED STATES PATENTS

| | | |
|---|---|---|
| 1,676,244 | Blackwell et al. | July 10, 1928 |
| 1,971,235 | Rettenmeyer | Aug. 21, 1934 |
| 2,000,190 | Rettenmeyer | May 7, 1935 |
| 2,049,147 | Wheeler et al. | July 28, 1936 |
| 2,145,548 | Landon | Jan. 31, 1939 |
| 2,159,546 | Bauer et al. | May 23, 1939 |
| 2,261,803 | Grundmann | Nov. 4, 1941 |
| 2,611,807 | Lazzery | Sept. 23, 1952 |
| 2,710,314 | Tongue et al. | June 7, 1955 |
| 2,710,315 | Tongue | June 7, 1955 |
| 2,735,988 | Fyler | Feb. 21, 1956 |